United States Patent [19]
Maloney, Jr.

[11] 4,114,759
[45] Sep. 19, 1978

[54] PROTECTIVE PACKAGE

[75] Inventor: James Francis Maloney, Jr., Industry, Pa.

[73] Assignee: E. I. Du Pont de Nemours and Company, Wilmington, Del.

[21] Appl. No.: 775,281

[22] Filed: Mar. 7, 1977

[51] Int. Cl.² .......................................... B65D 81/16
[52] U.S. Cl. ................................... 206/523; 206/508; 206/509; 215/12 R; 220/72; 220/410; 229/91
[58] Field of Search ............... 229/89, 90, 91; 217/21; 220/72, 91; 206/427, 431, 446, 508, 509, 523, 592; 215/12 R

[56] References Cited

U.S. PATENT DOCUMENTS

| T901,002 | 8/1972 | Gelak et al. ........................ 206/446 |
| 1,404,071 | 1/1922 | Thompson ............................ 217/21 |
| 2,685,319 | 8/1954 | Swasko ............................ 220/9 F X |
| 2,934,466 | 4/1960 | Molla .................................. 229/90 X |
| 3,120,319 | 2/1964 | Buddrus ............................ 220/9 F X |
| 3,419,184 | 12/1968 | Asenbauer ........................... 206/508 |
| 3,868,036 | 2/1975 | Wittwer .............................. 215/12 R |
| 3,986,610 | 10/1976 | Hawn .................................. 206/592 |

FOREIGN PATENT DOCUMENTS

| 2,241,468 | 3/1975 | France ................................. 220/9 F |
| 1,938,716 | 5/1970 | Fed. Rep. of Germany ............. 229/90 |
| 686,576 | 3/1953 | United Kingdom .................... 229/90 |
| 9,968 of | 1886 | United Kingdom .................... 229/90 |

Primary Examiner—Stephen Marcus

[57] ABSTRACT

A package for protecting an object enclosed therein from mechanical shock comprising two sections having approximately vertical sidewalls. The sections are molded from a resiliently compressible material in two-part molds, the parting lines of which are located at about the midpoint of the section sidewalls.

12 Claims, 4 Drawing Figures

PROTECTIVE PACKAGE

FIELD OF THE INVENTION

The invention relates to a molded package for protecting objects enclosed therein from mechanical shock. In particular, the invention is directed to such a package having improved protective capability sufficient to meet new Federal shipping standards.

BACKGROUND OF THE INVENTION

Two major problems present themselves in the shipping and handling of fragile goods in protective packaging. Firstly, the package with the goods enclosed therein must be capable of withstanding accidental mechanical shocks and, secondly, the package must be able to maintain a stable loading configuration despite substantially continuous vibration. The use of strapping, palleting and square containers can minimize the problem of cargo shifting. Nevertheless, they are not complete panaceas and, moreover, may frequently be quite costly. Though virtually any problem of protective packaging can be solved technically by the use of greater masses of shock-absorbing material in the package, such a simplistic solution is wastefully uneconomical for comparatively large and heavy objects.

A most graphic illustration of this quandary is the shipment of acids and other materials in, for example, 6½ gallon carboys. Heretofore, such containers have been shipped in two-part packages having upper and lower sections which are flanged at either the top or the middle. Such containers have usually been substantially cylindrical or frustoconical in shape, except for the protrusion of the flange, and were molded in two-part molds, the parting line of which were located at the matching edge of the flange. Such containers have been largely satisfactory from the standpoint of shock resistance standards required by Federal regulations heretofore in effect; however, they require an excessive amount of shock absorbent material and are quite prone to incur a rocking action when they are packed in a shipping compartment. Furthermore, containers of this type have been found to be inadequate to comply with new Federal DOT regulations for shock resistance.

BRIEF DESCRIPTION OF THE INVENTION

The invention is therefore directed to a new and improved package for protecting an object enclosed therein from mechanical shock comprising an upper section having a top endwall from which extends a unitary substantially vertical sidewall terminating in a lower edge; and a lower section comprising a bottom endwall on which the object rests when the package is in an upright position and from which extends a unitary substantially vertical sidewall terminating in an upper edge matching the lower edge of the upper section, (1) the contour of the inner sidewall surface of the sections being adapted to conform substantially to the contour of the outer sidewall surface of the enclosed object, except to the extent the inner sidewall surface of the sections is interrupted by coring and crush ribs, (2) the sections each being molded from resiliently compressible material by means of a two-part mold, the parting line of the male and female components of which is located at about the midpoint of the outer wall of the section, and (3) the sections are of approximately equal height.

In a preferred aspect of the invention, the inner sidewall surface of each section from the level of the parting line to the edge thereof is cored in such manner as to form a plurality of inner longitudinal channels which are matching when the edges of the upper and lower sections are placed in alined and abutting relationship; and the outer sidewall surface of each section between the parting line and the edge thereof is cored in such manner as to form a longitudinal groove and wall on each side of the inner channel, the walls being deformable when a force is applied to the inner shoulder thereof, and the grooves matching when the edges of the upper and lower sections are placed in alined and abutting relationship.

DESCRIPTION OF THE DRAWINGS

The invention is illustrated by the drawings hereto which consist of two sheets, each containing two figures.

DEFINITIONS

Figure 1:
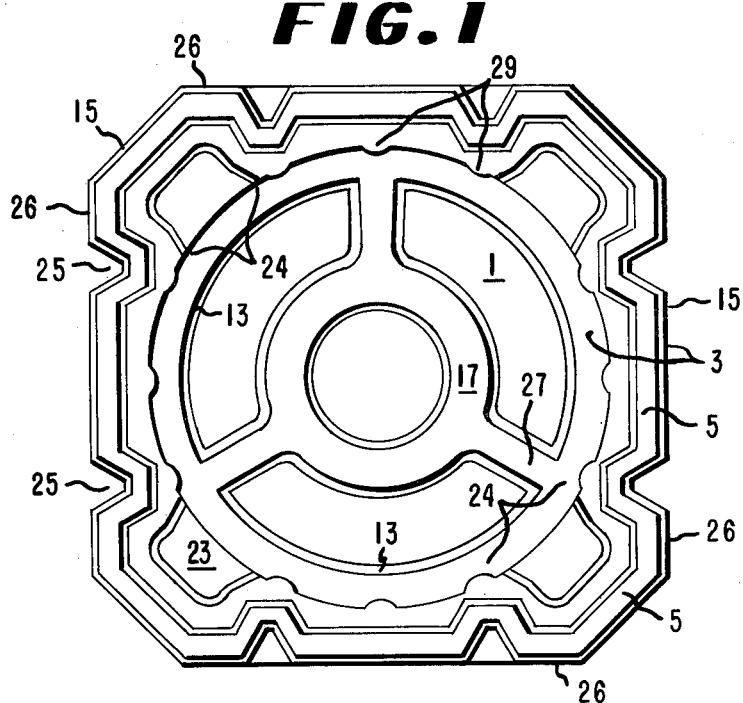
FIG. 1 is a view upward into a preferred configuration for the upper section of the package of the invention.

As used herein the terms "coring" and "cored" refer generically to concavities of any shape in the surface of reference. The term is not meant to imply any particular method of obtaining the concavity or to any particular concavity characteristic.

DETAILED DESCRIPTION OF THE INVENTION

The invention is broadly applicable to a wide variety of objects having varied shapes for which protection against mechanical shock may be sought. However, the invention is most advantageous when it is used for an elongated regular object having the peripheral shape of a cylinder, elipse or higher polygon. The invention is a particularly effective package for cylindrical objects such as bottles. However, it will be apparent to those skilled in the art that the invention can easily be adapted to less regular shapes.

For use in enclosing regular shapes having a circular or regular polygonal cross-section, a preferred peripheral shape is that of an equiangular octagon, especially one having sides of two different lengths, the shorter sides of which are from 25-80% as long as the longer sides. Such shapes pack together quite stably because of the parallel character of the opposing side sets.

An essential aspect of the invention is the location of the parting line of the two-part mold. In particular, the parting line must be at about the midpoint of the outer wall of each section. By this means, the outer walls of the package will most closely approach true verticality at any given mold release angle, and present the largest shock-absorbing area for lateral forces impinging thereon. It will, however, be apparent that the location of the parting line can vary somewhat from the exact midpoint and still have the same advantages, albeit to a reduced degree. In particular, it has been found that the parting lines can lie closer to the edge or to the endwall by as much as about 25%, of the total section length, but preferably no more than about 15%. However, it is essential that the parting lines of the sections be located at about the same relative point on the sidewall to avoid the rocking action, which has been discussed above. That is, if the parting line in the upper section is located, say, 6 inches above the lower edge, then the parting line in the lower section should be located 6 inches below the upper edge. By this means, the assembled sections when loaded closely together meet firmly at the parting lines and then cannot undergo any rocking action independently of each other.

Even though the primary thrust of the invention lies in having the parting line of the package section at or close to the midpoint of the section, this configuration is adaptable to still further advantages in both performance and economics. In particular, it has been found that if the interior of the package is cored to form a plurality of regularly spaced inner longitudinal channels and if the exterior of the package is similarly cored to form a plurality of grooves and walls on each side of the inner channel, the longitudinal corrugation formed thereby is resiliently deformable in the manner of a spring and thus augments the shock-absorbing properties of the resiliently compressible material from which the package is made.

When longitudinal reinforcing channels of the above-described type are used in accordance with the invention, they extend at least from the level of the parting line to the matching edge of each section in such manner that when the sections are matched and alined, the channels in both sections coincide and form a continuous channel from the parting line of one section to the parting line of the other. Optionally, any of the channels can also be extended beyond the parting line as well.

In a still further preferred form of the invention, further rigidity and strength is added to the package by coring the outer surface of each section between the parting line and endwall in such manner as to form a reinforcing rib extending from the outer shoulder of each inner channel to the endwall.

When the protected object is a bottle, carboy or other cylindrical container having an upper neck, it will often be preferred to provide a collar adapted to fit around the neck of the object extending from the top endwall of the upper section to the top of the object or the shoulder if the object is a bottle. In such cases, it will also be preferred to reinforce the collar with a plurality of radial ribs extending from the outer surface of the collar to the inner surface of the sidewall of the section.

The lower edge of the upper section and the upper edge of the lower section must, of course, be matching and preferably are interlocking so as to prevent lateral displacement of the edges. They can also be correspondingly grooved and recessed to prevent rotational displacement of the edges as well. A simple but effective configuration of the edges to prevent lateral displacement is a lap joint.

To prevent independent movement of the package when it is tightly loaded with other like packages, it will also be preferred to provide ribs and recesses on the endwalls of the section so that when the package is nested, interlocking of the ribs within the recesses prevents both lateral and rotational displacement of the package. For ease in stacking, it is preferred that the ribs and corresponding recesses be intersecting.

The package of the invention can be fabricated from a wide variety of moldable resiliently compressible materials including polyethylene, polypropylene, polystyrene, polyvinylchloride, synthetic and natural rubbers and the like. However, those materials which can be molded to form foamed structures are preferred. At the present time, the pre-eminent material for use in the manufacture of protective packaging is polystyrene, particularly expanded polystyrene.

Expandable polystyrene is obtained conveniently in the form of small, dense beads or pellets. Upon the application of heat, the polystyrene particles are transformed into a strong, smooth-skinned foam which can have density of as little as 0.8 to as much as 20.0 lbs/ft$^3$ (ca. 13–320 kg/m$^3$). However, for use in shock-absorbing packaging, molded foam densities should vary from about 1.2 to about 5 lbs/ft$^3$ (ca. 19–80 kg/m$^3$), a density of from about 1.5 to 2.5 lbs/ft$^3$ (ca. 24–40 kg/m$^3$) being particularly effective.

Expandable polystyrene can be charged directly into a mold, expanded and formed into the mold cavity shape by heat. However, to obtain more uniform density, it will ordinarily be preferred to subject the expandable polystyrene to unconfined partial expansion prior to molding and then transfer the partially expanded polymeric material to the mold cavity. The expansion can be carried out by application of heat from a variety of sources; however, steam is usually preferred because of its economy and availability. A continuous steam pre-expander is described in U.S. Pat. No. 3,023,175.

Foamed polystyrene particles can be molded by several methods in molds made of aluminum, stainless steel or brass. The selection of particular molding methods depends upon a variety of factors such as size, configuration, density, maximum thickness of the foam piece and even the production volume. The importance of these factors will be apparent to those skilled in the art.

The package of the invention uses to advantage the fact that the sections thereof must be molded in a two-part mold. In this type of mold steam is usually introduced into the mold cavity through core vents or through holes drilled through the mold from the steam chest. The invention can readily be molded in either single or multi-cavity molds. An essential aspect of the construction of the molds, however, is that the parting line of the two-part mold must be at about midpoint of the outer wall of each section, as has been discussed hereinabove.

As will be recognized by those skilled in the molding art, a small draft or mold release angle is necessary to provide for ready release of the object from the molds when they are opened. Thus, the sides of the section will always be slightly tapered even though they are substantially vertical. A mold release angle of at least about 0.5° and no more than about 5° is preferred. Though higher mold release angles are feasible, the preferred range gives more even distribution of the forces when adjacent packages are placed in compression, as when a cargo shifts due to swaying of the vehicle in which it is carried.

The package of the invention will be further understood by reference to the attached drawings.

FIG. 1 is a view looking upward into a preferred form of the upper section of the invention package from the open end of the section. From the top endwall 1 extends a substantially vertical sidewall 3 which terminates in a lower edge 5. As can be seen by the representation of both the inner and outer sidewall surfaces 13 and 15, respectively as a double line, the surfaces of the sidewall are tapered to provide the desired degree of draft angle. In this preferred form of the upper section, which is intended for use in protecting 6½ gallon acid carboys, the outer sidewall surface 15 is in the configuration of an equiangular octagon having alternating sides of two different lengths. The inner sidewall surface conforms substantially to the outer surface of the carboy it is intended to protect, except to the extent it is interrupted by crush ribs 29 and by the inner longitudinal reinforcing channels 23. The outside surface of the sidewall 15 is correspondingly cored beneath the mold parting line with longitudinal grooves 25 which form a wall with the inner longitudinal channels 23. The channel or corrugation, which results from this combination of longitudinal interior and exterior grooves, functions in the manner of a spring and is resiliently deformed when a force is applied to either the inner shoulder 24 or the outer shoulders 26 of the reinforcing channel 23. Because this preferred form of package is intended for use in protecting carboys or bottles, a rigid collar 17 is provided extending downward from the top endwall 1 to the shoulder of the contained carboy or bottle. Additional reinforcement of the collar 17 is obtained by means of a plurality of radial ribs 27 which extend from the outer surface of the collar 17 to the sidewall 3.

Figure 2:
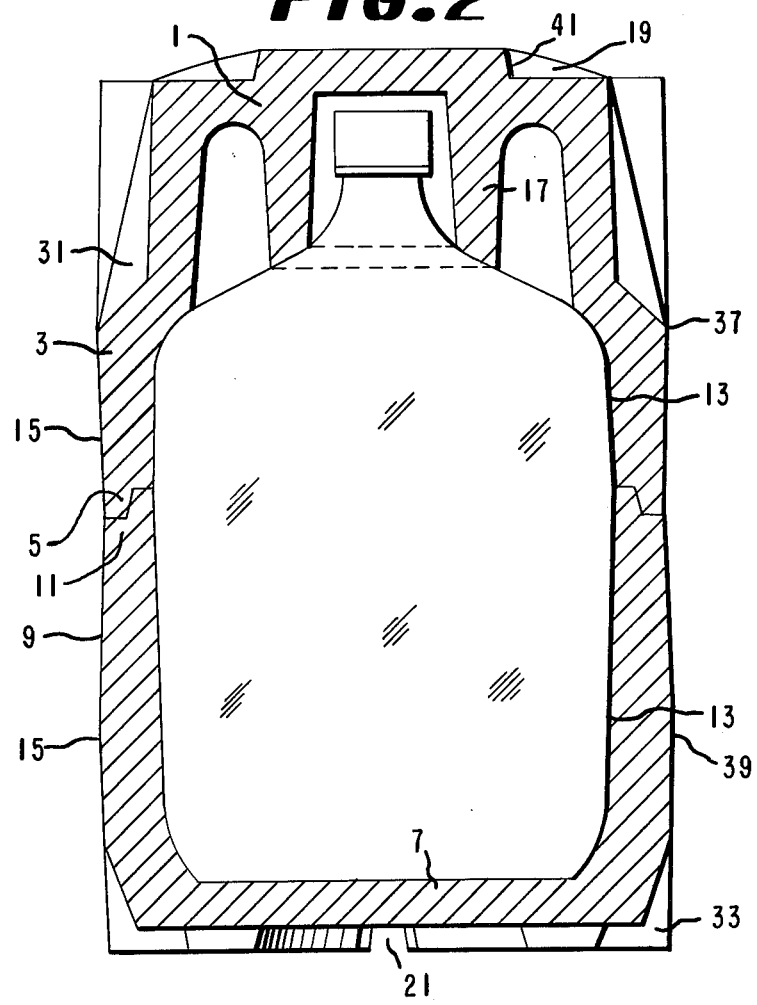
FIG. 2 is an elevation view of a longitudinal cross-section of the invention showing its relationship to a 6½ gallon acid carboy enclosed therein.

FIG. 2 is a cross-sectional elevation of the package when both the upper sections and lower sections are placed together in matching relationship enclosing a 6½ gallon carboy.

In this Figure it can be seen that the upper sidewall 3 extends from the top endwall 1 in an offset fashion because of the configuration of the article, which is protruding, and the terminal lower edge 5 is lap jointed to effect interlocking with the corresponding terminal upper edge 11 from the lower section. As described above, with respect to FIG. 1, it can be seen that the reinforcing collar 17 extends from the top endwall 1 to the shoulder of the carboy which is contained by the package. It can also be seen that the inner wall surfaces 13 of the sidewalls 3 and 9 of both sections conform substantially with the outer surface of the contained object as, of course, does the bottom endwall 7 as well. In this view of the package, the slight deviation of the outer sidewalls 15 from true verticality because of the mold draft angle is more apparent. Also shown in this view are stacking ribs 19 and stacking disk 41 and the corresponding recesses 21 in the bottom of the lower section. Also shown are top reinforcing ribs 31 and bottom reinforcing ribs 33.

Figure 3:
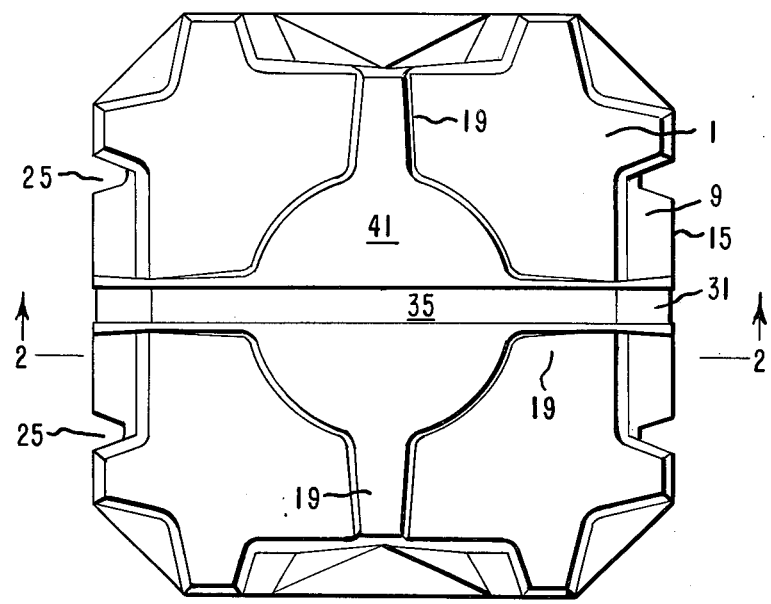
FIG. 3 is a plan view of the top of the upper section of the package of the invention and FIG. 4 is an elevation view of the exterior of the invention. The indicated components of the invention which appear in more than one bear the same number designation in each Figure.

FIG. 3 is a top view looking downward on the same upper section which is illustrated in FIG. 1. From the top endwall 1 the sloping upper surface 9 of the sidewall 15 extends downwardly. Outer longitudinal grooves 25 are readily visible in this view of the package. However, it will be noted that the corresponding grooves on the adjacent longer sides have been cored out to effect a savings in material. Atop the endwall 1 are seen stacking ribs 19 and stacking disk 41 which coact to facilitate stacking of the package. Furthermore, a shallow groove in the sloping surface 9 of outer sidewall 15, reinforcing rib 31 and the corresponding stacking rib 19 forms a continuous taping slot 35. By correspondingly grooving the reinforcing ribs, bottom endwall and outer sidewall of the lower section, the taping slot extends around the entire package when it is placed in alined and abutting relationship. Thus, the package can be firmly closed for shipping with the use of conventional plastic, cloth or metal taping materials.

Figure 4:
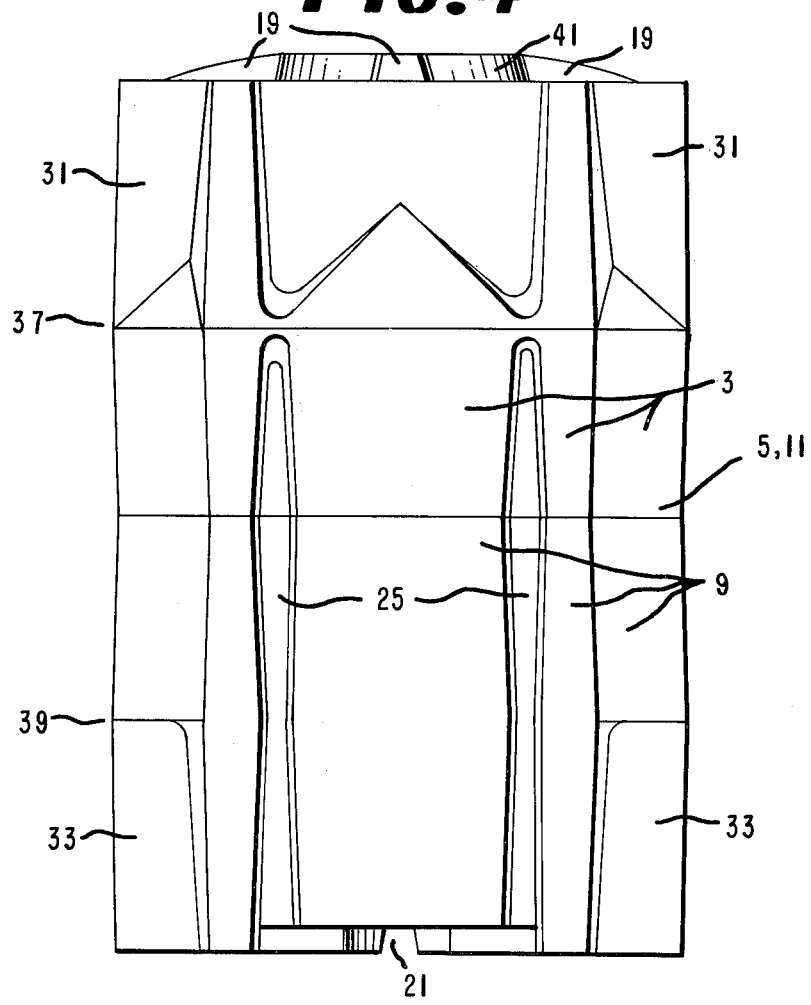

FIG. 4 is an elevation view of one side of the assembled package which is described in the previously discussed figures and, is, in fact, equivalent to FIG. 2. In this view of the invention the mold parting line of the lower section 39 is shown as being at precisely the midpoint thereof, whereas the parting line of the upper section 37 is slightly below the midpoint (43% of the sidewall height). This was done in order to provide more cushioning action on the carboy at the point opposite the shoulder of the carboy. In addition, the longitudinal grooves 25 described with respect to FIGS. 1 and 3 are shown more clearly. The coring of the upper sidewall area between the outer shoulder 26 of the reinforcing channel above the parting line, as described with respect to FIG. 1, is also shown in greater detail.

The advantages of the invention are shown by the following examples:

EXPERIMENTAL PROCESS AND APPARATUS

The advantages of the invention are well illustrated by observing compliances of the invention with Federal Department of Transportation (DOT) regulations regarding overpacks for use in shipping 6½ gallon glass carboys containing aqueous liquids such as sulfuric acid and other chemical reagents via motor vehicle, rail freight or cargo vessel. Per DOT regulations:

"Packaging prescribed is a 6½ gallon non-DOT specification glass carboy overpacked in an expandable polystyrene overpack made from beads or granules of polystyrene and having a minimum density of 1.7 pounds per cubic foot. The two-section polystyrene container must be closed for shipment with a pressure sensitive cloth or laminated tape 2½ inches wide (minimum) and having a tensile strength of not less than 50 pounds per inch of width or one or more vertical nonmetallic straps adequate to secure the closure against the required drop tests and condition incident to transportation."

Sample packages filled with water to capacity, prepared as for shipment, must be capable of withstanding without breakage of bottle or leakage therefrom, a flat drop on bottom, all sides and top from a height of 4 feet. A minimum of six packages must be tested, each not required to be subjected to more than one drop.

The above-referred drop testing is carried out using an apparatus such as the L.A.B. Type JD-100 S Drop Tester[1]. The apparatus is comprised of a heavy metal base plate to which is attached vertical tubular post. A spring-driven platform is attached to the vertical post by means of a support arm which is adjustable at various heights along the post. The spring-driven platform supports the package prior to release and is locked in place by means of a solenoid-operated latch mechanism. Upon release of the latch mechanism, the platform is accelerated by the spring away from the bottom of the package and out of its path of fall, thus allowing the package to fall freely. For flat drops (e.g., side, top and bottom drops), the package merely rests on the top face of the platform. For edge and corner drops, the package must be supported in the desired position either manually by the operator or by means of jigs attached to the platform.

[1]Trade Name of L.A.B. Corp., Skaneateles, NY

In accordance with the above-quoted regulation, the package is deemed a "pass" if the carboy remains intact.

EXAMPLE 1

A series of 4-ft drop tests was conducted using the preferred form of the invention which is set out in the drawings and is described above. Top, bottom and side drops were conducted on overpacks made of foamed polystyrene having a density of 1.53, 1.80 and 2.5 lbs/ft$^3$ (24.5, 28.6 and 40.0 kg/m$^3$, respectively) containing a 6½ gallon carboy filled with water. At least four drops of each type were made at each overpack density. The overpack was taped using longitudinal tape slots.

The drop tests revealed that none of the overpacks failed, i.e., the carboy containing the water remained intact in each of the tests at all three densities. Thus, all the overpacks complied with the DOT safety regulations described above.

EXAMPLE 2

An even more severe series of tests was conducted when a similar series of overpacks was drop tested by means of a 45° corner drop from a height of 4 feet. The overpack having a density 1.53 lbs/ft$^3$ sheared upon impact and the enclosed water-filled carboy broke. However, the overpack having a density of 1.80 lbs/ft$^3$ incurred only minimal cracking in the foam structure and the contents remained unbroken. Furthermore, the overpack having a density of 2.50 lbs/ft$^3$ incurred no damage at all and, of course, the contents remained unbroken. This test illustrates that a minimum density of about 2.0 lbs/ft$^3$ is preferred to give the package sufficient corner drop resistance in the 4-ft drop test.

I claim:

1. A package for protecting an object enclosed therein from mechanical shock comprising an upper section having a top endwall from which extends a unitary substantially vertical sidewall terminating in a lower edge; and a lower section comprising a bottom endwall on which the object rests when the package is in an upright position and from which extends a unitary substantially vertical sidewall terminating in an upper edge matching the lower edge of the upper section, (1) the sections of approximately equal height being molded from resiliently compressible material by means of a two-part mold, the parting line of the male and female components of which is located at about the midpoint of the outer wall of each section, said outer surface of each section tapering inward to the extent of the mold relief angle from the parting line toward the edge of each section and toward the endwall of each section, and (2) the contour of the inner sidewall surface of the sections being adapted to conform substantially to the contour of the outer sidewall surface of the enclosed object, said inner sidewall surface of each section from the level of parting line to the edge thereof is cored in such manner as to form a plurality of inner longitudinal channels which are matching when the edges of the upper and lower sections are placed in alined and abutting relationship and the outer sidewall surface of each section between the parting line and the edge thereof is cored in such manner as to form a longitudinal groove and wall on each side of the inner longitudinal channels, the walls being deformable when a force is applied to the inner shoulder thereof, and the grooves matching when the edges of the upper and lower sections are placed in aligned and abutting relationship.

2. The package of claim 1 in which the inner channels extend between the parting line and endwall of each of the sections.

3. The package of claim 1 in which the outer surface of each section between the parting line and endwall is cored in such manner as to form a reinforcing rib extending from the outer shoulder of each inner longitudinal channel to the endwall of the section.

4. The package of claim 2 in which the mold relief angle is less than about 5°.

5. The package of claim 1 for use in enclosing a bottle having a collar adapted to fit around the neck of the bottle extending inwardly from the top endwall of the upper section to the shoulder of the bottle.

6. The package of claim 5 in which the collar is reinforced by a plurality of radial ribs extending from the collar to the sidewall of the upper section.

7. The package of claim 1 in which the upper and lower edges of the section sidewalls are interlocking to prevent lateral displacement of the edges.

8. The package of claim 1 in which protuberant ribs are molded onto the outer surface of the top endwall and corresponding recesses are molded into the outer surface of the bottom endwall so that, when the package is nested, interlocking of the ribs within the recesses prevents both lateral and rotational displacement of the package.

9. The package of claim 8 in which the ribs and corresponding recesses are intersecting.

10. The package of claim 1 in which the general shape of the periphery of the sections is an equiangular polygon.

11. The package of claim 10 in which the equiangular polygon is an octagon.

12. The package of claim 11 in which the octagon has alternating sides of two different lengths of which the shorter sides are 25–80% as long as the longer sides.

* * * * *

UNITED STATES PATENT OFFICE
CERTIFICATE OF CORRECTION

PATENT NO. : 4,114,759

DATED : September 19, 1978

INVENTOR(S) : James Francis Maloney, Jr.

It is certified that error appears in the above-identified patent and that said Letters Patent are hereby corrected as shown below:

On face page, Item [73] Assignee:, change " E. I. Du Pont de Nemours and Company, Wilmington, Del." to -- Tuscarora Plastics, New Brighton, Pa. --.

Signed and Sealed this

Third Day of April 1979

[SEAL]

Attest:

RUTH C. MASON
Attesting Officer

DONALD W. BANNER
Commissioner of Patents and Trademarks